Jan. 15, 1957
L. E. WOOD
2,777,537
PRESSURE RESPONSIVE APPARATUS
Filed March 18, 1953
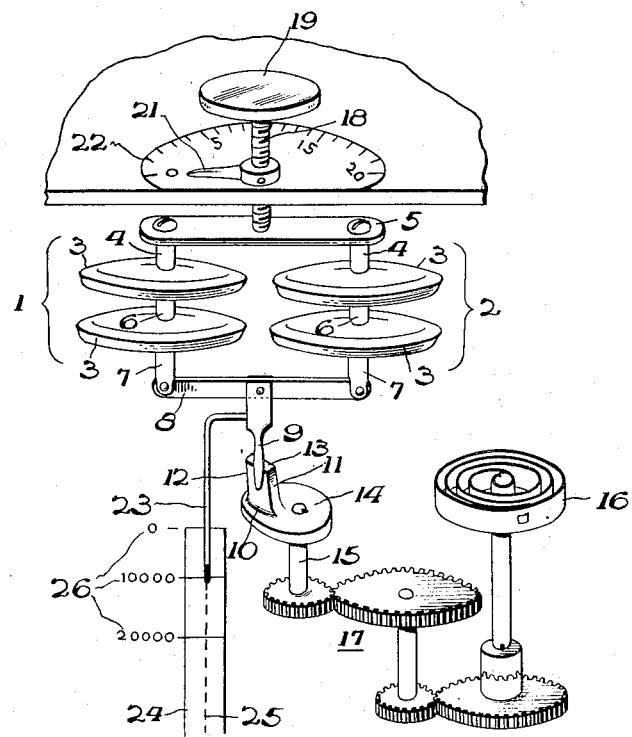
INVENTOR
*Louvan E. Wood.*
BY *Robert F. Peck*
ATTORNEY

United States Patent Office 2,777,537
Patented Jan. 15, 1957

2,777,537

PRESSURE RESPONSIVE APPARATUS

Louvan E. Wood, Glenarm, Md., assignor to Bendix Aviation Corporation, Baltimore, Md., a corporation of Delaware Application March 18, 1953, Serial No. 343,209

7 Claims. (Cl. 185—37)

This invention relates generally to pressure responsive apparatus and, in particular, to a novel arrangement of parts designed to respond to abnormal conditions of operation of a pressure responsive device.

There are many applications wherein a pressure responsive device performs a control and/or indicating function, and despite the most careful precautions taken during manufacture and testing of such devices, errors can creep into the performance of such devices upon the lapse of an extended period of time subsequent to final factory calibration and check, such errors rendering the device totally useless for many applications. One such application, to which the subject invention is ideally adapted, is that of an automatic parachute opening device. As is well known to those skilled in the art, such devices are designed to automatically open a parachute at a preselected altitude, and in this instance the devices must be absolutely reliable and safe otherwise they would be totally unfit for use. In many cases, particularly in the present day trend of higher and higher altitudes in flying, one using such a device would be unconscious and unable to open his chute unless some automatic and absolutely reliable means were provided to do the job for him.

Most automatic parachute opening devices utilize a hermetically sealed pressure responsive capsule having a predetermined deflection-pressure characteristic over the entire range of atmospheric pressure, whereby the force or motion generated by the deflection of the capsule is utilized to cooperate with suitable mechanism to perform a parachute opening operation. Such parachute opening devices are normally unattended and not used over extended periods of time but must be so designed that absolute reliability of operation is assured in the event of an emergency arising necessitating their use. As is well known to those skilled in the art, it is possible for hermetically sealed pressure responsive capsules to develop leaks over extended periods of time despite the most careful and thorough precautions taken during manufacturing and assembly. The tiniest microscopic hole in the capsule body or in the hermetically sealed joint can, over a long period of time, render the capsule totally useless as a pressure sensing device, for in the normal application of such capsules a substantially evacuated chamber is provided and it is the expansion and contraction of this chamber during changes in pressure which give rise to the deflection-pressure characteristic. Obviously, with no vacuum, no pressure differential could exist across the capsule and thus no deflection would be generated. Such a possibility is most undesirable in a parachute opening device where failure to perform would most certainly mean loss of life to the one relying upon successful performance.

Although the leak problem as aforesaid described, is the most serious and insidious defect that could possibly exist in a pressure responsive device, and is the one defect which the subject invention positively overcomes, it is possible that other abnormalities could occur, and the subject arrangement is equally adapted to respond to other such abnormalities in performance.

Basically, the subject invention comprises the use of a pair of pressure responsive devices arranged in a parallel position and having their corresponding moving ends connected to a common member to thereby drive same in response to changes in pressure. Not only does the existence of a pair of devices increase the force or motion available for indicating or controlling, but the arrangement of the two devices gives rise to a simple and effective means for indicating the presence of leaks and other abnormal conditions of operation. In the illustrated embodiment, the two devices comprise, each in themselves, a pair of diaphragm assemblies and the common member is pivotally mounted at its extremities to the moving ends of the pair of pressure responsive devices. With the corresponding fixed ends of the diaphragm assembly mounted in a common supporting surface, it is obvious that equal motion of the two sets of assemblies, under equal changes of pressure, will give rise to a uniform parallel motion of the common member. However, in the event that one side of the pressure unit develops an abnormal deflection-pressure characteristic, such as would occur as a result of a leak, the unbalanced motion derived therefrom gives rise to a tilting or pivoting action of the common member. Through a suitable linkage and indicator device, this abnormality will be quite easily detected. Furthermore, when the device is used as a stop or trigger in connection with motor means for pulling the rip-cord, the simple action provided by the invention will give rise to a "fail safe" characteristic, in that the presence of leaks will cause the device to respond in such a way that the motor means would be operated independent of pressure and thus "fail safe" under such conditions.

The invention will be best understood upon reference to the detailed description set forth below when taken in conjunction with the single figure annexed hereto, in which is shown one embodiment of the invention as arranged for use in automatic parachute opening devices.

Referring to the drawing, there is shown a pressure responsive assembly in the form of a pair of pressure responsive means 1 and 2, each of said means comprising a pair of identical diaphragm assemblies 3, thus giving a total of four diaphragm assemblies in all available for use in the intended application. These diaphragm assemblies are well known to those skilled in the art and, in essence, comprise a pair of upper and lower shells hermetically sealed together at the peripheries of their co-acting flanges. Such devices are common and familiar to those skilled in the art and detailed description of same is omitted herefrom for the sake of brevity. Suffice to say that the diaphragm assemblies are made of a thin resilient metal and the interior of each cell, as they may be conveniently termed, is substantially evacuated so that under conditions of increasing atmospheric pressure the upper and lower diaphragm shells are deflected together and under decreasing pressure the cell will expand, giving rise to forces and/or motion which is available for indicating and/or controlling operations. The upper diaphragms of each of the pressure responsive assemblies have similar studs 4 affixed thereto in any conventional manner, and these studs are in turn affixed to a common support plate 5 by means of screws or the like. A pair of identical spacer studs 6 separate the lower and upper capsules in each diaphragm assembly and a pair of identical studs 7 are affixed to the lower free ends of the diaphragm assemblies, these studs being similarly affixed in any conventional manner. Pivotally secured to these studs is the cross member 8, having suitably affixed thereto at its center the downwardly extending elongated member 9.

With the arrangement of parts so far described in mind, and considering the support plate 5 to be fixed with respect to the diaphragm assemblies, and assuming that the ambient pressure is on the order of a few millibars, the individual cells 3 will be expanded to their near maximum volume to thereby move the elongated member 9 downwardly, very nearly to its ultimate limit of travel. As the ambient pressure increases, the cells 3 will contract and cause upward motion of the elongated member 9.

Cooperating with elongated member 9 is the vertical extending abutment 10, having the side edges 11, 12 and the top edge 13. The abutment member 10 projects from a suitable crank arm 14 affixed to the shaft 15 and interconnected to the spring 16 by means of the gear train 17. The spring 16 and associated gear train 17 schematically represents one form of motor means which can be operated by the pressure responsive device. With the proper choice of directions for motion of the various parts, it is readily seen that when the lower extremity of elongated member 9 contacts the face of abutment 10, the motor will be retained in its inoperative position, having its energy stored, in the application shown, in the form of spring 16, ready for use at any time the restraining force on abutment 10 is removed. Once the elongated member 9 moves in an upward direction a sufficient amount to clear the top edge 13 of abutment 10, the crank 14 is free to rotate and thus the restraining influence on the motor means is eliminated to thereby permit the motor to actuate its associated mechanism. In the case of an automatic parachute opening device, the spring motor would pull the ripcord of the chute, it being understood that suitable interconnecting parts could be properly arranged and connected to the gear train to effect such operation. Furthermore, suitable winding mechanism could be provided for the spring 16 and all other associated parts necessary to adapt the motor for use in connection with the parachute opening device. These parts have been omitted from the present description as they do not form a part of the invention and further, as such arrangements are well known and common to those skilled in the art, they require no detailed description for an understanding of their operation. Suffice to say that the schematic arrangement shown is intended to represent broadly a form of motor normally restrained from operation by means of the abutment 10 and its associated elongated member 9.

To make the device capable of operation over a preselected range in altitude (which is another way of saying a preselected range in barometric pressure), the support plate 5 is made movable with respect to the abutment 10, and this relative motion can be readily accomplished by means of the screw 18 and associated knob 19. This arrangement is only a schematic showing of one means of changing the position of support plate 5, and it is to be understood that any conventional method for accomplishing such action could be used, as this part of the device per se forms no part of the subject invention, the only requirement being that the device be capable of performing through a range in altitude. A pointer 21 is arranged on the screw shaft 18 to cooperate with a scale 22, having indicia thereon showing a range in altitude from zero to 20,000 feet. The effect of turning the knob 19 and setting the pointer 21 to correspond to some portion of the scale or dial 22 is to physically move the assemblies of pressure devices and its associated member 9 with respect to abutment 10. If the pointer is set at 20,000 feet, the design of the parts is such that when the altitude of 20,000 feet is reached the elongated member 9 will clear the top edge 13 freeing abutment 10 to thereby permit the motor 16 to actuate the ripcord.

As is well known to those skilled in the art, suitable arming pins, or the like, and other safety devices can be added to the arrangement to prevent premature operation of the motor in the event of flight maneuvers covering a wide range in altitude, including a preselected altitude for which the device is intended to respond. Such arrangements are conventional and form no part of the subject invention and have been omitted for the sake of brevity. Thus far the operation described is a normal intended one wherein all four pressure responsive capsules respond uniformly through changes in pressure to give rise to uniform motion on both ends of common member 8. Equal deflection on the extremities of member 8 will cause the member 9 to travel up and down in substantially a straight-line path of travel lying at all times between the edges 11, 12 of abutment 10.

Connected to elongated member 9 there is a second elongated member 23 in the form of a pointer, extending downwardly and cooperating with the scale 24, having traced thereon the predetermined path of travel for the pointer 23, which in this case is in the form of a straight line 25. A series of indicia 26 are also provided on scale 24 so that the pointer 23 can give a visible indication of instantaneous barometric pressure. Under normal operation of the device the pointer 23 will move up and down along the line 25 and at any instant its position will show the elevation of the one using the equipment.

Now in the case of a leak developing in any one of the cells 3, such leak either occurring gradually or suddenly but existing long enough so that the degree of vacuum existing within the leaking cell is substantially changed, such cell will be practically ineffective as a pressure sensing device in that its deflection-pressure characteristic will be substantially changed. In an extreme case the deflection would drop to zero if the leak were large enough to prevent the possibility of differential pressure existing across the surfaces of the coacting cells. Should this change in deflection-pressure characteristic take place in one of the cells, the motion on the extremities of member 8 will be unequal, thereby causing same to tilt around its axis to thus introduce a component of motion in the members 9 and 23 at right angles to the normal motion experienced by such members. In the case of the pointer 23, it will move to the right or the left of the line 25, as shown in the drawing, and such deviation from its normal predetermined path of motion will instantly indicate the presence of an imperfection in the equipment. In this way presence of leaks can be detected immediately before flight departure so that the defective unit can be discarded and a good one substituted in its place. Obviously, the same situation could prevail after flight departure if a sudden leak should occur, and at least the one using the equipment would know that same was defective and thus would not rely on the equipment as he would if there were no abnormalities indicated by the pointer 23. Furthermore, assuming the apparatus to be functioning properly, a secondary altitude indicator is provided by means of the scale 24 and associated indicia 26.

Should the leak or defect in the equipment arise suddenly and during flight, the arrangement is such that the mechanism will fail in the safe condition in that tilting of member 8 will also cause the member 9 to swing to the right or the left to thereby clear the abutment 10 and permit the motor to function in its usual manner.

From the above it is immediately apparent that a simple and effective means has been provided to indicate the presence of abnormalities in operation of the pressure responsive apparatus, and at the same time provide a "fail safe" feature in the control component governed thereby. One bad cell is sufficient to actuate the mechanism and for all practical purposes the device could be considered completely reliable for the most stringent of applications. The only possibility of failure of the device to perform as expected would be the presence of identical errors in both of the pressure responsive assemblies 1 and 2. With the use of two diaphragms in each assembly, such possibility is mathematically quite remote, providing a very high safety factor for nearly all applications. Present day manufacturing techniques would most certainly prevent duplication of defects in both of the pressure means 1 and 2, so that for those cases wherein a leak would occur to one of the cells 3, the device would work as intended. Any other abnormalities of operation giving rise to unequal deflection at the extremities of member 8 would also be detected by the arrangement described above.

Furthermore, it is to be understood that the specific motor means shown in schematic form could be substituted for by other motor means, provided that the substitution would not in any way interfere with the principle of operation of the pressure responsive means 1 and 2 and their associated members 8, 9 and 23.

What is claimed and desired to be secured by United States Letters Patent is:

1. Pressure responsive apparatus, comprising: pressure-responsive means including a pair of substantially identical hermetically sealed diaphragm assemblies each having substantially identical normal deflection-pressure characteristics, said diaphragm assemblies being arranged side by side, the corresponding ends of said diaphragms at one end of said assemblies being held fixed and the corresponding ends of the diaphragms at the opposite end of said assemblies being free to move, a common member to which said movable ends are each pivotally connected, motor means, means driven by said pressure-responsive means through a predetermined path, said driven means normally cooperating with said motor means to prevent operation thereof until a predetermined ambient pressure is attained and also being adapted to permit operation of said motor means before said predetermined pressure is attained should the deflection-pressure characteristic be abnormal, means for indicating the presence of such abnormal deflection-pressure characteristics, said driven means including an elongated member affixed to said common member and extending and moving in a direction substantially parallel to the direction of motion of said diaphragm assemblies, a rotatable abutment member, said elongated member moving through a substantially straight-line path of travel in response to normal operation of said diaphragm assembly to cooperate with said abutment member and prevent rotation of same through a predetermined range of ambient pressure, said abutment member being operatively connected to said motor means.

2. The combination defined by claim 1 wherein the existence of an abnormal deflection-pressure characteristic in either of said diaphragm assemblies will cause a shift in the position of said elongated member whereby same will no longer contact said abutment member.

3. The combination defined by claim 1 wherein said abutment member has a pair of side edges and a top edge, said elongated member occupying a position intermediate said side edges and moving parallel thereto under normal conditions of operation and having a component of motion at substantially right angles to said side edges when said pressure-responsive apparatus is functioning abnormally, said component of motion at right angles being sufficient to permit movement of said elongated member out of contact with said abutment member.

4. The combination defined by claim 1 wherein said indicating means comprises a second elongated member so mounted as to move along a predetermined straight line path of travel in response to normal operation of said pressure-responsive apparatus and having a component of motion at substantially right angles to said straight-line path of travel when said pressure-responsive apparatus is functioning abnormally, the said second elongated member cooperating with chart means having a straight line ruled thereon whereby deviations from normal operation can be visibly detected.

5. The combination defined by claim 4 wherein said chart is provided with indicia corresponding to a range of ambient atmospheric pressure, said indicia cooperating with said second elongated member to thereby give instantaneous indications of ambient pressure.

6. For use in automatic parachute release mechanism, a plurality of hermetically sealed pressure-responsive capsules having predetermined normal deflection-pressure characteristics, a leak-indicating member, means connecting said member to said capsules causing it to move in response to normal deflection of said capsules through a predetermined path, a surface associated with said member and having thereon means delineating said path, said path being correlated to said deflection-pressure characteristics, said connecting means being arranged to cause said member to deviate from said path should a leak produce abnormal deflection of any of said capsules, motor means for controlling the parachute release mechanism, a control device for said motor means, and means operatively connecting said device to said connecting means in a manner such as to permit operation of said motor means should said indicating member deviate materially from said path.

7. For use in automatic parachute release mechanism, a plurality of hermetically sealed pressure-responsive capsules arranged in parallel, said capsules having predetermined normal deflection-pressure characteristics, means supporting said capsules with one end fixed and the opposite end free to move in response to changes in ambient pressure, a leak-indicating member, means connecting said member to the movable ends of said capsules causing it to move in response to normal deflection of said capsules through a predetermined path, a surface associated with said member and having thereon means delineating said path, said path being correlated to said deflection-pressure characteristics, said connecting means being arranged in a manner such that as long as said capsules remain sealed the member will follow said path but will deviate therefrom should a leak produce abnormal deflection of any of said capsules, motor means for conrtrolling the parachute release mechanism, a control device for said motor means, and means operatively connecting said device to said connecting means in a manner such as to permit operation of said motor means should said indicating member deviate materially from said path.

References Cited in the file of this patent

UNITED STATES PATENTS

| 2,187,061 | Smith | Jan. 16, 1940 |
| 2,239,438 | Cockrell | Apr. 22, 1941 |
| 2,255,814 | Roche | Sept. 16, 1941 |

FOREIGN PATENTS

| 3,264 | Great Britain | Dec. 5, 1862 |
| 16,299 | Great Britain | Nov. 26, 1887 |